United States Patent

Low et al.

[15] 3,666,942
[45] May 30, 1972

[54] ANALYSIS OF HYDROGEN-DEUTERIUM MIXTURES

[72] Inventors: George M. Low, Deputy Administrator of the National Aeronautics and Space Administration with respect to an invention of; Harry C. Lord, III, 3740 Hampton Road, Pasadena, Calif. 91107

[22] Filed: Nov. 6, 1970

[21] Appl. No.: 87,550

[52] U.S. Cl. ..........................................250/43.5 R, 73/23.1
[51] Int. Cl. ......................................................G01n 21/34
[58] Field of Search ...............................73/23.1; 250/43.5 R

[56] References Cited

UNITED STATES PATENTS

| | | |
|---|---|---|
| 3,319,458 | 5/1967 | Curren....................................73/23.1 |
| 3,462,261 | 8/1969 | Silas.......................................73/23.1 |
| 3,589,171 | 6/1971 | Haley......................................73/23.1 |

*Primary Examiner*—William F. Lindquist
*Attorney*—Monte F. Mott, Wilfred Grifka and John R. Manning

[57] ABSTRACT

A hydrogen-deuterium mixture is partially separated by helium carrier gas chromatography to form an effluent which is measured to determine total hydrogen isotopic concentration. The HD component of the effluent is ionized to form $HD^+$ ions. The $HD^+$ 1-0 band absorption is then measured with a conventional high resolution infrared detector providing a signal indicative of absolute deuterium concentration (as HD). The H/D ratio is readily determined from the total concentration and deuterium concentration.

11 Claims, 2 Drawing Figures

Patented May 30, 1972

3,666,942

INVENTOR.
HARRY C. LORD III

BY Wilfred Griffin
Monte F. Mott
ATTORNEYS.

ANALYSIS OF HYDROGEN-DEUTERIUM MIXTURES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to analysis of hydrogen-deuterium mixtures and more particularly, to an improved technique and apparatus for determining the H/D ratio of these mixtures.

2. Description of the Prior Art

The direct analysis of streams of hydrogen gas for traces of deuterium has long been desired. In extra-terrestrial exploration, a determination of hydrogen-deuterium (H/D) ratio would be useful in dating soil and minerals exposed to solar wind irradiation by utilizing the released gas from a pyrolyzed sample; in analysis of planetary atmospheric gases to determine their origin; and, in analyzing the solar wind, to provide a limit for the H/D ratio in the sun.

Extra-terrestrial hydrogen may well have an even lower deuterium concentration than terrestrial hydrogen in which the D/H ratio is about $1.56 \times 10^{-4}$. Deuterium separation by gas chromatography is not feasible for these very low concentrations. Furthermore, mass spectrometers are not generally applicable for these measurements because of possible helium interference, possible hydrogen adsorption on the walls, possible sample pumping losses and other problems.

Various experimenters have attempted to determine H/D ratios directly by conventional infrared absorption analysis of gas samples. Unionized HD has bands in the infrared region well separated from other bands. Unfortunately, as pointed out by Durie and Herzberg (Can. J. Physics 38, 806, 1960), the electronic selection rule forbids transitions in the infrared band and thus, they are relatively weak. The 1-0 band of HD requires 30 meteratm for detection.

SUMMARY OF THE INVENTION

The measurement technique in accordance with the invention takes advantage of the unique property of ionized deuterium-containing gas which is more readily analyzed with infrared absorption analysis equipment than the unionized gas. In accordance with the invention hydrogen is separated from a gas mixture and the total hydrogen isotope concentration is determined. The hydrogen/deuterium component may be partially separated from the other hydrogen isotopes before being ionized to form HD$^+$ ions. The 1-0 band of HD$^+$ (or HD$^-$) should be $10^6$ times as intense as that of HD, because the charge center is not coincident with the mass center resulting in an induced dipole.

Utilizing a 1-meter cell, with 10 passes of light, the detection limit for HD$^+$ is $3 \times 10^{-6}$ atm. With the gas at 1 atm, one could measure 3 ppm HD. The HD$^+$ 1-0 band absorption can be measured with conventional high resolution infrared detectors giving the absolute deuterium concentration as HD. The absolute hydrogen concentration is obtained from a conventional chromatographic detector to provide the other quantity necessary to determine the H/D ratio.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
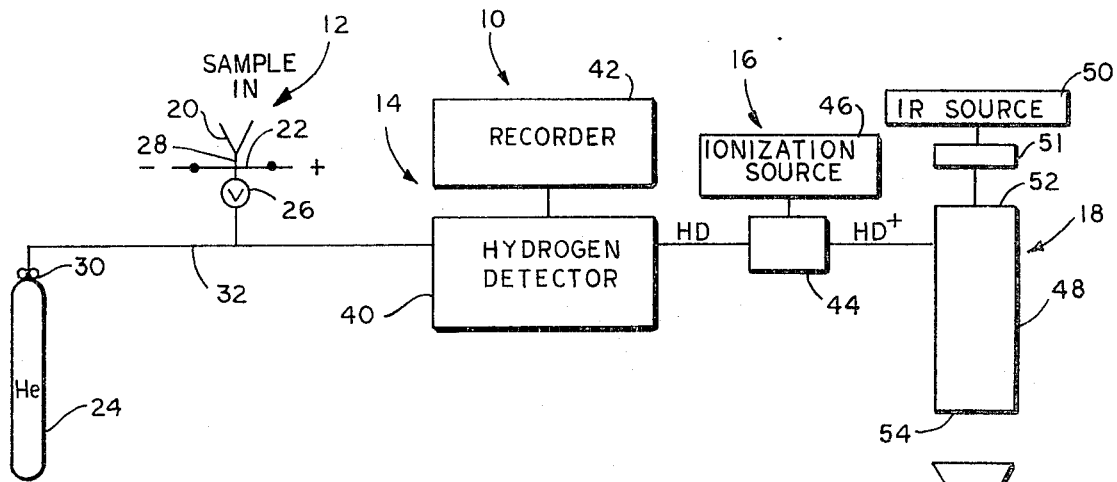
FIG. 1 is a schematic illustration of a first embodiment of a H/D analysis system.

Referring now to FIG. 1, the analytical 10 generally includes a sampling section 12, a hydrogen separation and detection section 14, an ionization section 16 and an infrared analysis section 18.

A hydrogen-deuterium containing sample is sampled from the ambient atmosphere through nozzle 20. Gases other than hydrogen can be eliminated by passing the sample through a heated palladium containing film 22 which is totally and selectively permeable to hydrogen and its isotopes when heated to a temperature above about 150° C. suitably about 200° C. Pure palladium is subject to embrittlement when heated in an atmosphere of hydrogen. A palladium alloy containing 15-35 percent of silver, gold or rhodium, suitably a 75Pd-25Ag alloy is as permeable to hydrogen and is mechanically stable under these conditions. The film 22 may be heated by passing an electric current through the film from an electric potential source, not shown.

The hydrogen sample is carried through the apparatus by a carrier gas suitably, helium provided by a source 24. The sample is admitted to the system by opening valve 26 in the sample line 28 and setting the regulating valve 30 on the helium source 24 at a desired level. The helium sweeps past the junction of the sample conduit 28 and the supply conduit 32 and draws the sample out of the sample conduit to form a dispersion which flows into detector 40. The detector 40 may be a conventional chromatographic detector which develops a signal indicative of total hydrogen isotopic content. The signal is applied to a recording device 42. The hydrogen-deuterium (HD) containing dispersion then enters an ionization chamber 44 in which it is ionized to form an effluent containing HD$^+$ ions. Ionization is typically effected by applying to the HD containing dispersion high energy radiation from a source 46 such as high energy-low wavelength, ultraviolet photons typically having a wavelength below 2,000 angstroms or radiation from a beta ray source.

The HD$^+$ effluent leaves the ionization source and is delivered to an infrared transparent detection cell 48 of a high resolution infrared detector 18. Higher sensitivity for HD$^+$ ion absorption could be obtained by presetting the infrared detector to monitor particular absorption peaks. Characteristic infrared radiation is applied to one wall 52 of the cell 48 from an infrared source 50 and a monochromator 51 to produce a beam containing a narrow band pass of the characteristic wavelengths to be absorbed. The characteristic absorption is determined by positioning an infrared detector 56 opposite another wall 54 of the cell 48. The deflector 56 is suitably a thermocouple or bolometer. The resulting signals developed in detector 56 are applied to a recorder 58, through amplifier electronics 59.

The signal recorded in recorder 58 is indicative of HD$^+$ concentration and the signal recorded in recorder 42 is indicative of total hydrogen concentration. A ratio of these signals provides a quantity indicative of the H/D concentration of the sample.

The detector may also be operated in a dual beam-dual cell mode by utilizing a standard reference cell filled with pure helium or with a gas containing a known HD concentration to serve as a reference standard. The ionization of the HD effluent from the chromatograph need not be effected in separate operation or chamber. The ionization may be effected in the infrared analysis cell or the chromatograph detector by applying ionizing radiation to these units. It has further been discovered that partial separation of the deuterium component by gas chromatography preliminary to ionization increases the sensitivity of the HD$^+$ detection.

Figure 2:
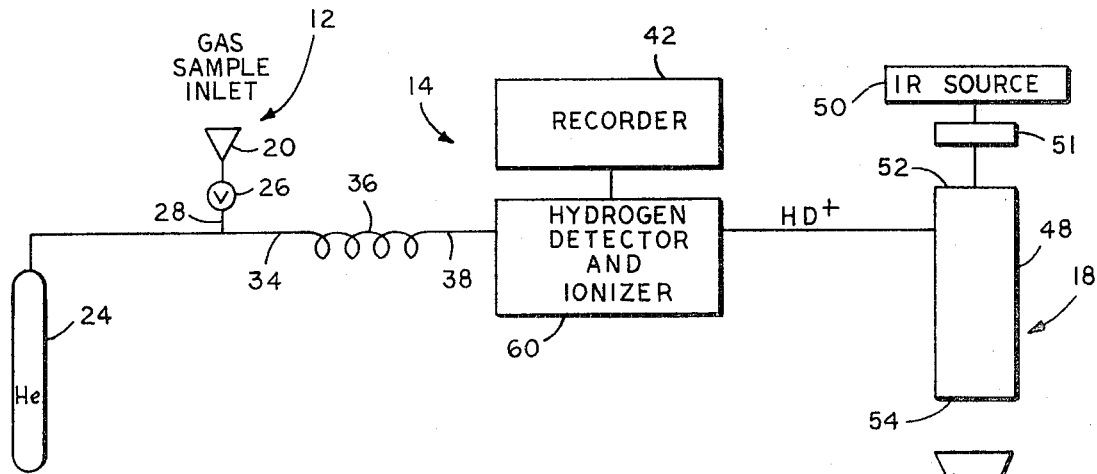
FIG. 2 is a schematic illustration of a second embodiment of a further H/D analysis system.

Referring now to FIG. 2, a dispersion of sample in carrier gas is formed as the carrier gas sweeps past inlet pipe 28 when valve 28 is open.

The dispersion enters the inlet 34 of the chromatographic column 36 and carries the dispersion through the column to form an effluent leaving the outlet 38. The effluent contains segregated sequential bands of the components of the original sample.

The gas chromatographic column 36 contains an adsorbent capable of segregating the hydrogen-deuterium mixture into bands. The adsorbent may be an alumina material coated with palladium or ferric oxide ($Fe_2O_3$), such as disclosed by Thomas et al., J. Phys. Chem. 63, 427–432, 1959; or Shipman, Anal. Chem. 34, 877–878, 1962.

A capillary glass tubing, suitably 0.2 mm id, which has been internally etched with ammonium hydroxide ($NH_4OH$) forms an amorphous glass surface capable of segregating the hydrogen-deuterium mixtures as disclosed by Mohnke et al., Proceedings of the 4th International Gas Chromatography Symposium, M. Van Swaay, editor, Chapter 16, 216–224, Butterworths, Inc., 1962. The capillary column will usually require several hundred feet of length to effectively segregate the carrier gas sample mixture into bands of components and to effect at least a partial separation of the HD component.

The hydrogen and deuterium containing component of the sample leave the column outlet 38 and enter the chromatographic detector section. The effluent from the chromatographic column can be applied to a chromatographic detector 60 which is capable of detecting the hydrogen isotopic concentration and simultaneously ionizing the HD to $HD^+$ ions. Suitably the combination detector-ionizer 60 can be a helium ionization detector such as the Beckman HID detector which contains a glow discharge unit emitting high energy ultraviolet photons having a wavelength below 2,000 A. Another suitable detector-ionizer is a tritium foil metastable helium detector which operates on the principle of an ionization cross-section detector for hydrogen and deuterium and subjects the HD molecules to beta ray emission to convert the molecules to $HD^+$ ions.

The $HD^+$ ionized component enters detection cell 48 and the deuterium concentration as HD is determined as previously described. The deuterium quantity recorded in recorder 58 and the total hydrogen isotope concentration recorded in recorder 42 provide the desired ratio.

In accordance with the invention, by separating and detecting the hydrogen-deuterium component of the sample and then forming a $HD^+$ effluent which is separately detected by an infrared detector, information indicative of the H/D concentration is directly determined. This technique is capable of measuring trace amounts of deuterium in hydrogen gas with very high sensitivity.

It is to be understood that only preferred embodiments of the invention have been described and that numerous substitutions, alternations and modifications are all permissible without departing from the spirit and scope of the invention as defined in he following claims.

What is claimed is:

1. A method of determining the amount of deuterium in a hydrogen-deuterium containing mixture comprising the steps of:

separating the hydrogen-deuterium component of the mixture;

detecting the total hydrogen isotopic concentration of the component;

ionizing the component to form $HD^+$ ions;

irradiating the ionized component with infrared radiation; and measuring the characteristic absorption of said radiation by said ions.

2. A method according to claim 1 in which said separation is effected by dispersing said mixture in helium carrier gas and flowing the dispersion through a gas chromatograph to form an effluent containing a band of said component containing a partial separation of HD isotopes.

3. A method according to claim 1 in which said ionizing and detecting are effected simultaneously.

4. A method according to claim 1 in which said ionizing and irradiating are effected simultaneously.

5. A method according to claim 1 in which said component is ionized by applying ionizing radiation to said component.

6. A method according to claim 6 in which said ionizing radiation comprises high energy-low wavelength ultraviolet photons having a wavelength below 2,000 A.

7. A method according to claim 6 in which the ionizing radiation is a beta ray.

8. A method according to claim 1 in which said component is separated by passing said mixture through a heated palladium containing film.

9. An apparatus for analyzing the amount of deuterium in a hydrogen-deuterium containing mixture comprising in combination:

separation means for separating the hydrogen-deuterium component of the mixture;

detection means receiving the separated component and for determining the total hydrogen isotope concentration of said component;

ionizing means for ionizing the HD molecules of said component to $HD^+$ ions;

infrared analysis means for analyzing the amount of $HD^+$ ions in said ionized component.

10. An apparatus according to claim 9 in which said separating means includes a source of carrier gas for forming a dispersion of said component, gas chromatograph column means for forming an effluent containing a band of said component and a gas chromatographic detector means for determining the amount of hydrogen isotopes in said band and in which said ionizing means comprises a source of ionizing radiation applied to said effluent.

11. An apparatus according to claim 10 in which said gas chromatographic detector means includes a source of ionizing radiation.

* * * * *